US012571897B2

(12) United States Patent　　(10) Patent No.:　US 12,571,897 B2
Chen　　(45) Date of Patent:　Mar. 10, 2026

(54) VEHICLE-MOUNTED POSITIONING ASSEMBLY, METHOD, DEVICE, AND APPARATUS EMPLOYING ULTRA-WIDEBAND

(71) Applicants: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

(72) Inventor: Guoan Chen, Hangzhou (CN)

(73) Assignees: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

( * ) Notice: Subject to any disclaimer, the term of this patent is extended or adjusted under 35 U.S.C. 154(b) by 366 days.

(21) Appl. No.: 18/021,835

(22) PCT Filed: Oct. 29, 2020

(86) PCT No.: PCT/CN2020/124864
§ 371 (c)(1),
(2) Date: Feb. 17, 2023

(87) PCT Pub. No.: WO2022/036859
PCT Pub. Date: Feb. 24, 2022

(65) Prior Publication Data
US 2024/0272292 A1　　Aug. 15, 2024

(30) Foreign Application Priority Data
Aug. 18, 2020　(CN) ........................ 202010829279.X

(51) Int. Cl.
*G01S 13/02*　　(2006.01)
*G01S 5/02*　　(2010.01)
(Continued)

(52) U.S. Cl.
CPC ...... *G01S 13/0209* (2013.01); *G01S 5/02213* (2020.05); *G01S 5/0284* (2013.01); *G01S 5/10* (2013.01); *H01Q 5/25* (2015.01)

(58) Field of Classification Search
CPC ............. G01S 13/0209; G01S 5/02213; G01S 5/0284; G01S 5/10; G01S 5/0209;
(Continued)

(56) References Cited

U.S. PATENT DOCUMENTS 9,942,709 B2 *　4/2018　Sung ......................... G01S 5/02
10,219,166 B2 *　2/2019　Friday ................... H04W 4/021
(Continued)

FOREIGN PATENT DOCUMENTS

CN　　101236597 A　　8/2008
CN　　104111443 A　　10/2014
(Continued)

OTHER PUBLICATIONS

Chinese Intellectual Property Office (ISR/CN), "International Search Report for PCT/CN2020/124864", China, May 19, 2021.
(Continued)

*Primary Examiner* — Vladimir Magloire
*Assistant Examiner* — Kimberly Jenkins
(74) *Attorney, Agent, or Firm* — Westbridge IP LLC

(57) ABSTRACT

Disclosed are a vehicle-mounted positioning assembly, method, device, and apparatus employing ultra-wideband. The assembly comprises at least one ultra-wideband (UWB) module (1) and multiple anchor antennas (2). The multiple anchor antennas (2) are divided into groups that are disposed in respective preset installation regions of a vehicle, such that signal regions of the multiple anchor antennas (2) cover a preset region around and/or inside the vehicle. An output end of the at least one ultra-wideband (UWB) module (1) is in time-sharing connection with two or more anchor anten-
(Continued)

nas (2) located at different positions and/or oriented in different directions. The assembly enables the number of installed ultra-wideband (UWB) modules (1) to be reduced while maintaining the same number of anchor antennas (2), and increases the operational use time of a single ultra-wideband (UWB) module (1), thereby reducing production costs and use costs.

10 Claims, 5 Drawing Sheets

(51) Int. Cl.
*G01S 5/10* (2006.01)
*H01Q 5/25* (2015.01)

(58) Field of Classification Search
CPC ...... G01S 2205/01; H01Q 5/25; H01Q 1/325; H01Q 1/125; H01Q 3/26; H04W 4/021; H04W 4/48; H04W 4/023; H04W 64/00; Y02D 30/70; H04B 7/0604; H04B 7/0691; H04B 7/0874
See application file for complete search history.

(56) References Cited

U.S. PATENT DOCUMENTS

| | | | |
|---|---|---|---|
| 10,328,899 B2 * | 6/2019 | Golsch | B60R 25/245 |
| 10,631,166 B1 * | 4/2020 | Noonan | H04W 8/005 |
| 10,856,108 B2 * | 12/2020 | Min | G01S 5/0242 |
| 2019/0256047 A1 * | 8/2019 | Iwashita | G01S 13/0209 |
| 2020/0047715 A1 | 2/2020 | Park et al. | |
| 2022/0070883 A1 * | 3/2022 | Choi | H04B 7/06952 |
| 2022/0108613 A1 * | 4/2022 | Estep | B66F 9/0755 |

FOREIGN PATENT DOCUMENTS

| | | | | |
|---|---|---|---|---|
| CN | 204596181 U | 8/2015 | | |
| CN | 105068044 A | 11/2015 | | |
| CN | 107844126 A | 3/2018 | | |
| CN | 108248545 A | 7/2018 | | |
| CN | 108351400 A | 7/2018 | | |
| CN | 109844823 A | 6/2019 | | |
| CN | 110456305 A | 11/2019 | | |
| CN | 111220940 A | 6/2020 | | |
| JP | 2008085430 A | 4/2008 | | |
| JP | 2017118474 A | 6/2017 | | |
| JP | 2019510199 A | 4/2019 | | |
| JP | 2019121949 A | 7/2019 | | |
| JP | 2019168439 A | 10/2019 | | |
| JP | 2020067396 A | 4/2020 | | |
| KR | 20120019040 A | 3/2012 | | |
| KR | 102009791 B1 * | 8/2019 | ............... | G01S 5/06 |
| WO | 2014065540 A1 | 5/2014 | | |
| WO | 2016176667 A1 | 11/2016 | | |
| WO | 2018079600 A1 | 5/2018 | | |
| WO | 2019058985 A1 | 3/2019 | | |
| WO | 2020077214 A1 | 4/2020 | | |
| WO | WO-2020091286 A1 * | 5/2020 | ........... | G01S 13/878 |

OTHER PUBLICATIONS

European Search Report issued in counterpart European Patent Application No. EP 20950063.6, dated Jan. 8, 2024.

Notice of Reasons for Refusal issued in counterpart Japanese Patent Application No. JP 2023-511912, dated Feb. 27, 2024.

Office Action issued in counterpart European Patent Application No. EP 20950063.6, dated Jan. 22, 2024.

Request for the Submission of an Opinion issued in counterpart Korean Patent Application No. KR 10-2023-7007570, dated Jan. 22, 2024.

Communication about Intention to Grant a European patent issued in counterpart European Patent Application No. EP 20950063.6, dated Sep. 16, 2024.

Notice of Final Rejection issued in counterpart Korean Patent Application No. KR 10-2023-7007570, dated Aug. 22, 2024.

Notice of Reasons for Refusal issued in counterpart Japanese Patent Application No. JP 2023-511912, dated Aug. 6, 2024.

Notice of Reasons for Refusal issued in counterpart Japanese Patent Application No. JP 2023-511912, dated Jan. 28, 2025.

\* cited by examiner

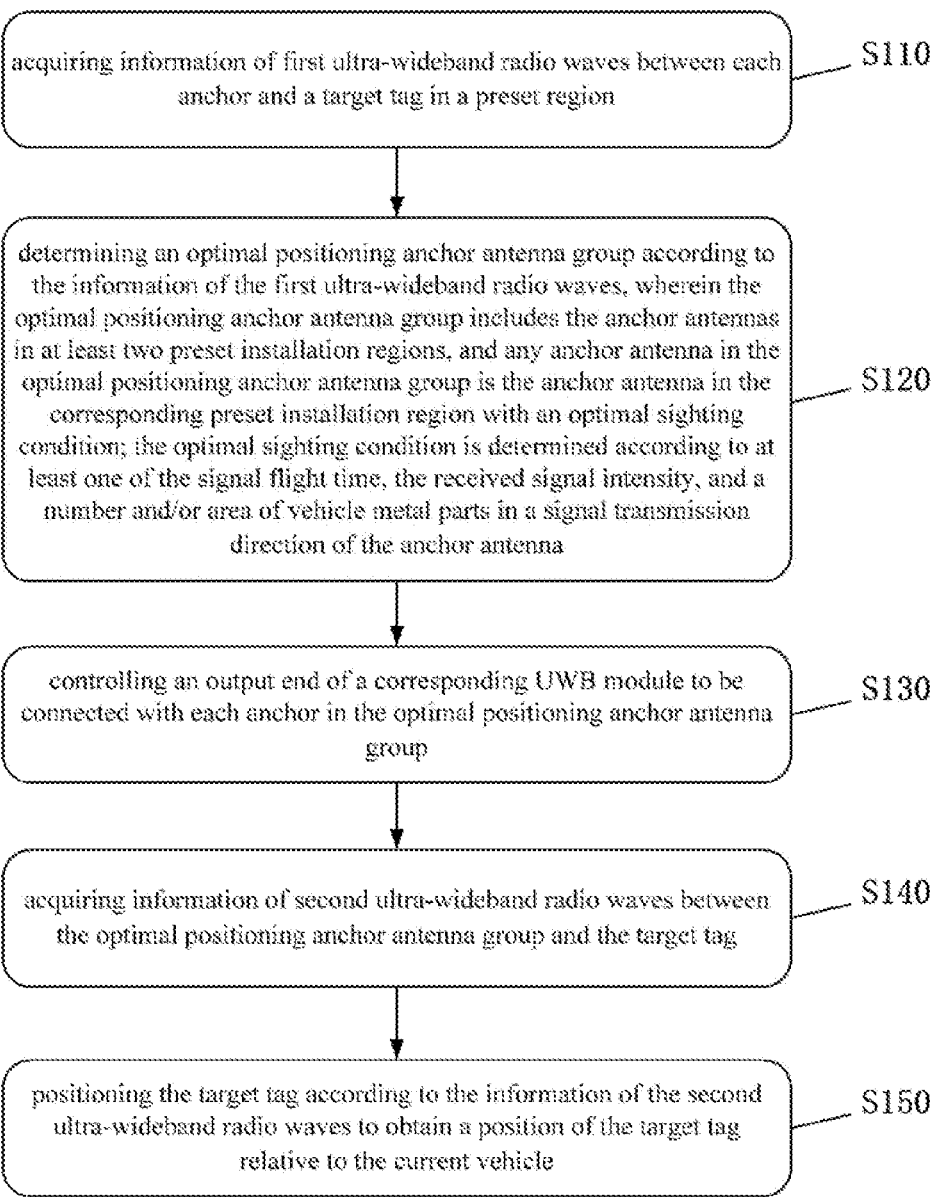

acquiring information of first ultra-wideband radio waves between each anchor and a target tag in a preset region — S110 determining an optimal positioning anchor antenna group according to the information of the first ultra-wideband radio waves, wherein the optimal positioning anchor antenna group includes the anchor antennas in at least two preset installation regions, and any anchor antenna in the optimal positioning anchor antenna group is the anchor antenna in the corresponding preset installation region with an optimal sighting condition; the optimal sighting condition is determined according to at least one of the signal flight time, the received signal intensity, and a number and/or area of vehicle metal parts in a signal transmission direction of the anchor antenna — S120 controlling an output end of a corresponding UWB module to be connected with each anchor in the optimal positioning anchor antenna group — S130 acquiring information of second ultra-wideband radio waves between the optimal positioning anchor antenna group and the target tag — S140 positioning the target tag according to the information of the second ultra-wideband radio waves to obtain a position of the target tag relative to the current vehicle — S150

Fig. 4

VEHICLE-MOUNTED POSITIONING ASSEMBLY, METHOD, DEVICE, AND APPARATUS EMPLOYING ULTRA-WIDEBAND

FIELD OF THE INVENTION

The present invention relates to the field of vehicle communication technologies, and particularly to a vehicle-mounted positioning assembly, method, device, and apparatus employing ultra-wideband.

BACKGROUND OF THE INVENTION

An ultra-wideband (UWB) technology is a carrier-free communication technology in which data is transmitted using nanosecond-level non-sinusoidal-wave narrow pulses instead of sinusoidal carriers, and signal peaks thereof are steep and narrow, and are easy to identify even in a noisy multi-channel environment. Therefore, the UWB technology may meet requirements of various kinds of short-distance wireless communication at present, and is particularly suitable for accurate positioning of dense multipath places, or the like, such as vehicle unlocking, automatic vehicle starting, in-vehicle passenger detection, vehicle-mounted unmanned aerial vehicle operation, automatic valet parking, automatic parking, parking lot entering, drive-through payment, or the like. An anchor station in a current vehicle-mounted UWB system is composed of 1 UWB module and 1 positioning anchor antenna, as shown in FIG. 1. A cost of the UWB module is a main part of a cost of the anchor station, and in order to meet requirements of positioning in a region around a vehicle and inside the vehicle, the UWB modules with the same number as the anchor antennas are required to be installed, such that the cost is high.

Therefore, there is a need to provide an improved vehicle-mounted positioning system which reduces production costs and use costs.

BRIEF DESCRIPTION OF THE INVENTION

In order to solve the above-mentioned technical problem, the present disclosure provides a vehicle-mounted positioning assembly, method, device, and apparatus employing ultra-wideband, which can reduce production costs and use costs.

In an aspect, the present disclosure provides a vehicle-mounted positioning assembly employing ultra-wideband, including: at least one ultra-wideband (UWB) module and multiple anchor antennas, wherein the multiple anchor antennas are divided into groups that are disposed in respective preset installation regions of a vehicle, such that signal regions of the multiple anchor antennas cover a preset region around and/or inside the vehicle; and an output end of the at least one ultra-wideband (UWB) module is in time-sharing connection with two or more anchor antennas located at different positions and/or oriented in different directions.

In another aspect, the present disclosure further provides a vehicle-mounted positioning method employing ultra-wideband, which is based on the above-mentioned vehicle-mounted positioning assembly employing ultra-wideband, and includes:

acquiring information of first ultra-wideband radio waves between each anchor antenna on a current vehicle and a target tag, wherein the information of the first ultra-wideband radio waves includes a signal intensity and a signal flight time of each first ultra-wideband signal transmitted between each anchor antenna and the target tag;

determining an optimal positioning anchor antenna group according to an estimated position, wherein the optimal positioning anchor antenna group includes the anchor antennas in at least two preset installation regions, and any anchor antenna in the optimal positioning anchor antenna group is the anchor antenna in the corresponding preset installation region with an optimal sighting condition; the optimal sighting condition is determined according to at least one of the signal flight time, the signal intensity, and a number and/or area of vehicle metal parts in a signal transmission direction of the anchor antenna;

controlling an output end of a corresponding ultra-wideband (UWB) module to be connected with each anchor antenna in the optimal positioning anchor antenna group;

acquiring information of second ultra-wideband radio waves between the target tag and each anchor antenna in the optimal positioning anchor antenna group; and positioning the target tag according to the information of the second ultra-wideband radio waves to obtain a located position of the target tag relative to the current vehicle.

In another aspect, the present disclosure further provides a vehicle-mounted positioning device employing ultra-wideband, including:

a first acquiring module configured to acquire information of first ultra-wideband radio waves between each anchor antenna on a current vehicle and a target tag, wherein the information of the first ultra-wideband radio waves includes a signal intensity and a signal flight time of each first ultra-wideband signal transmitted between each anchor antenna and the target tag;

a first positioning anchor antenna group determining module configured to determine an optimal positioning anchor antenna group according to the information of the first ultra-wideband radio waves, wherein the optimal positioning anchor antenna group includes the anchor antennas in at least two preset installation regions, and any anchor antenna in the optimal positioning anchor antenna group is the anchor antenna in the corresponding preset installation region with an optimal sighting condition; the optimal sighting condition is determined according to at least one of the signal flight time, the signal intensity, and a number and/or area of vehicle metal parts in a signal transmission direction of the anchor antenna;

a first control module configured to control an output end of a corresponding ultra-wideband (UWB) module to be connected with the anchor antenna in the optimal positioning anchor antenna group;

a second acquiring module configured to acquire information of second ultra-wideband radio waves between the target tag and each anchor antenna in the optimal positioning anchor antenna group; and a first positioning module configured to position the target tag according to the information of the second ultra-wideband radio waves to obtain a located position of the target tag relative to the current vehicle.

In another aspect, the present disclosure further provides a vehicle-mounted positioning apparatus employing ultra-wideband, including a processor and a memory, wherein the memory stores at least one instruction or at least one program, and the at least one instruction or the at least one program is loaded and executed by the processor to implement the vehicle-mounted positioning method employing ultra-wideband as described above.

In another aspect, the present disclosure further provides a vehicle, including the above-mentioned vehicle-mounted positioning assembly, device, or apparatus employing ultra-wideband.

The vehicle-mounted positioning assembly, method, device, and apparatus employing ultra-wideband as well as the vehicle according to the present disclosure have the following technical effects.

In the present disclosure, two or more anchor antennas are provided for some or all of the ultra-wideband (UWB) modules, such that the number of the installed ultra-wideband (UWB) modules can be reduced while the same number of anchor antennas are maintained, and the operational use time of a single ultra-wideband (UWB) module is increased, thereby reducing the production costs and the use costs.

The foregoing description merely briefly describes the technical solution of the present invention. To more clearly understand the technical means of the present invention, such that the technical means of the present invention can be implemented according to content of the specification, and to make the foregoing and other objectives, characteristics, and advantages of the present invention more comprehensible, specific embodiments of the present invention are described below.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings:

FIG. 4 is a schematic flow diagram of a vehicle-mounted positioning method employing ultra-wideband according to an embodiment of the present disclosure;

Figure 1:
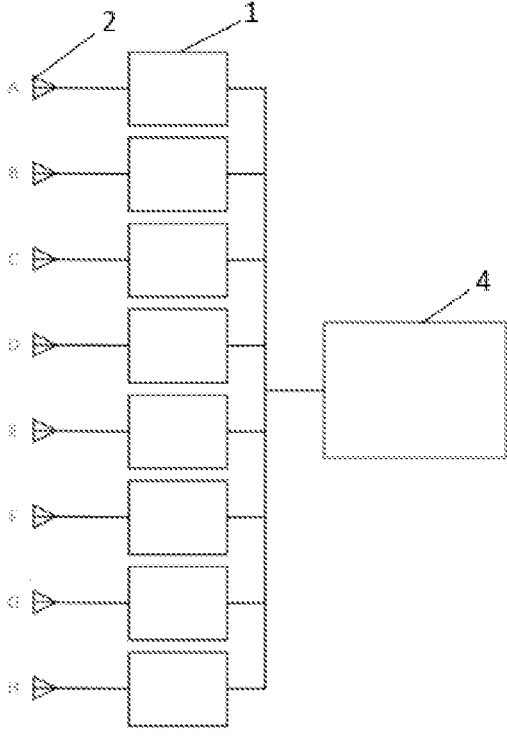
FIG. 1 is a schematic structural block diagram of a vehicle-mounted positioning system employing ultra-wideband in the prior art.

1—UWB module, 2—anchor antenna, 3—electronic switch, 4—positioning device, 100—current vehicle, 101—left front region, 102—right front region, 103—left rear region, 104—right rear region, 105—left region, 106—right region, 107—roof region, 200—target tag.

DETAILED DESCRIPTION

Exemplary embodiments of the present disclosure will be described in more detail below with reference to the accompanying drawings. Although exemplary embodiments of the present disclosure are shown in the drawings, it should be understood that the present disclosure may be embodied in various forms and should not be limited by the embodiments set forth herein. Rather, these embodiments are provided such that this disclosure will be thoroughly understood, and the scope of the disclosure will be fully conveyed to those skilled in the art.

The present disclosure provides a vehicle-mounted positioning assembly employing ultra-wideband, including: at least one ultra-wideband (UWB) module (hereinafter abbreviated as UWB module) and multiple anchor antennas 2, wherein the multiple anchor antennas 2 are divided into groups that are disposed in respective preset installation regions of a vehicle, such that signal regions of the multiple anchor antennas 2 cover a preset region around and/or inside the vehicle; and an output end of the at least one UWB module 1 is in time-sharing connection with two or more anchor antennas 2 located at different positions and/or oriented in different directions.

In an embodiment of the present disclosure, signal network regions covered by two adjacent anchor antennas 2 are overlapped.

In the embodiment of the present disclosure, the multiple anchor antennas 2 are divided into a plurality of groups that are arranged in different preset installation regions of the vehicle, and each group includes at least one anchor antenna 2. When each preset installation region is provided with a plurality of anchor antennas 2, the plurality of anchor antennas 2 are combined with one another to replace a range of a spatial solid angle covered by an original single anchor antenna 2, and since the spatial solid angle covered by each anchor antenna 2 is reduced, an antenna gain of each anchor antenna 2 may be increased, such that a signal network coverage range in a direction of the antenna is enlarged, or a gain budget margin in the original signal network coverage range is increased, thereby increasing a positioning distance range and reliability.

The preset installation regions may include, but are not limited to, a left front region 101, a right front region 102, a left rear region 103, a right rear region 104, a left region 105, a right region 106, a roof region 107, or the like, which are located relative to the vehicle, and specific positions and sizes of the preset installation regions may be determined according to different vehicle types or different signal detection requirements.

Further, different anchor antennas 2 may be used for signal transmission with a target tag 200 around or inside the vehicle to position the target tag 200 around or inside the vehicle. For example, three anchor antennas 2 are arranged in the left front region 101 of the vehicle, and compared with the arrangement of one anchor antenna 2, each of signal networks of the three anchor antennas 2 may cover a part of a signal transmission region of the left front region 101; that is, an anchor antenna 2 with a higher antenna gain may be used to improve a signal receiving capability, so as to detect a target tag 200 farther away from the vehicle.

In the embodiment of the present disclosure, the preset region around the vehicle may include an annular space or a hemispherical space around the vehicle, and/or the preset region may include part or all of a space inside the vehicle.

In some embodiments, the multiple anchor antennas 2 are divided into groups that are arranged in the left front region 101, the right front region 102, the left rear region 103 and the right rear region 104 of the vehicle.

In some other embodiments, the multiple anchor antennas 2 are divided into groups that are arranged in the left front region 101, the right front region 102, the left rear region 103, the right rear region 104, the left region 105 and the right region 106 of the vehicle.

In some other embodiments, the multiple anchor antennas 2 are divided into groups that are arranged in the left front region 101, the right front region 102, the left rear region 103, the right rear region 104, the left region 105, the right region 107 and the roof region 107 of the vehicle.

It should be noted that the division of different preset installation regions of the vehicle and the manner in which the anchor antennas 2 are divided into groups that are arranged in different preset installation regions of the vehicle may be determined according to a required coverage range of the preset region, and the number of the preset installation regions where the anchor antennas 2 are arranged or the number of the anchor antennas 2 in each group may be increased or decreased according to actual needs, and is not limited by the above description.

In the embodiment of the present disclosure, an electronic switch 3 is provided between the at least one UWB module 1 and the corresponding anchor antennas 2, and the output end of the at least one UWB module 1 is in time-sharing connection with the anchor antennas 2 located at different positions and/or oriented in different directions by switching of the electronic switch 3. The electronic switch 3 includes, but is not limited to, a radio frequency electronic switch.

In one embodiment, the vehicle-mounted positioning assembly includes 4 UWB modules 1 and 12 anchor antennas 2, each UWB module 1 may be in time-sharing connection with three anchor antennas 2 of different directions by switching of the electronic switch 3, and specifically, a first UWB module can be in time-sharing connection with A1, A2 and A3; a second UWB module can be in time-sharing connection with B1, B2 and B3; a third UWB module can be in time-sharing connection with C1, C2 and C3; and a fourth UWB module can be in time-sharing connection with D1, D2 and D3. The 12 anchor antennas 2 are equally divided into 4 groups, 1 group is provided on each of the left front region 101, the right front region 102, the left rear region 103 and the right rear region 104 of the vehicle, each group includes 3 anchor antennas 2, and specifically, A1, A2 and A3 are arranged on the left front region 101, D1, D2 and D3 are arranged on the right front region 102, B1, B2 and B3 are arranged on the left rear region 103, and C1, C2 and C3 are arranged on the right rear region 104. Thus, signal transmission with the target tag 200 within the preset region of the annular space around the vehicle is realized.

Figure 2:
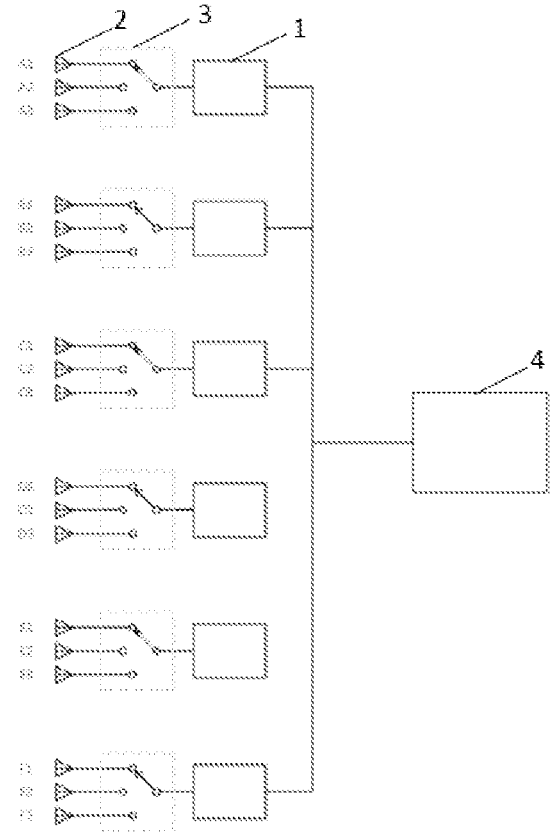
FIG. 2 is a schematic structural block diagram of a vehicle-mounted positioning system employing ultra-wideband according to an embodiment of the present disclosure.
Figure 3:
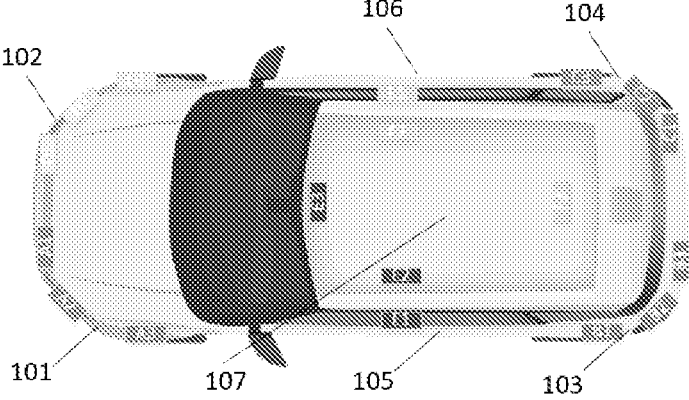
FIG. 3 is a schematic structural diagram in which an anchor antenna is installed on a vehicle in an embodiment of the present disclosure.

In another embodiment, referring to FIGS. 2 and 3, the vehicle-mounted positioning assembly includes 6 UWB modules 1 and 18 anchor antennas 2, each UWB module is in communication connection with a positioning device 4, each UWB module 1 may be in time-sharing connection with three anchor antennas 2 of different directions by switching of the electronic switch 3, and specifically, a first UWB module can be in time-sharing connection with A1, A2 and A3; a second UWB module can be in time-sharing connection with B1, B2 and B3; a third UWB module can be in time-sharing connection with C1, C2 and C3; a fourth UWB module can be in time-sharing connection with D1, D2 and D3; a fifth UWB module can be in time-sharing connection with E1, E2 and E3; and a sixth UWB module can be in time-sharing connection with F1, F2 and F3. The 18 anchor antennas 2 are divided into 7 groups, each of the left front region 101, the right front region 102, the left rear region 103 and the right rear region 104 of the vehicle is provided with 1 group including 3 anchor antennas 2, and specifically, A1, A2 and A3 are arranged on the left front region 101, D1, D2 and D3 are arranged on the right front region 102, B1, B2 and B3 are arranged on the left rear region 103, and C1, C2 and C3 are arranged on the right rear region 104; the roof region 107 of the vehicle is provided with 1 group including four anchor antennas 2 which are E2, E3, F2 and F3; each of the left region 105 and the right region 106 of the vehicle is provided with one group, each group includes one anchor antenna 2, and specifically, the left region 105 is provided with E1, and the right region 106 is provided with F1.

Further, in one implementation, the anchor antennas 2 on the left front region 101, the right front region 102, the left rear region 103 and the right rear region 104 of the vehicle are used for signal transmission with the target tag 200 outside the vehicle, and the anchor antennas 2 on the left region 105, the right region 106 and the roof region 107 are used for signal transmission with the target tag 200 inside the vehicle; that is, the preset region includes a first preset region of the annular space around the vehicle and a second preset region including the interior of the vehicle.

Further, in another implementation, the anchor antennas 2 on the left front region 101, the right front region 102, the left rear region 103, the right rear region 104, the left region 105 and the right region 106 of the vehicle are used for signal transmission with the target tag 200 outside the vehicle, and the anchor antennas 2 on the roof region 107 are used for signal transmission with the target tag 200 inside the vehicle.

Still further, in another implementation, the anchor antennas 2 on the left front region 101, the right front region 102, the left rear region 103, the right rear region 104, the left region 105, the right region 106, and the roof region 107 of the vehicle are used for signal transmission with the target tag 200 outside the vehicle, so as to realize signal transmission with the target tag 200 in the preset region of the hemispherical space around the vehicle.

Still further, in another implementation, all or some of the anchor antennas 2 on the left front region 101, the right front region 102, the left rear region 103, the right rear region 104, the left region 105, the right region 106, and the roof region 107 of the vehicle may be used for signal transmission with the target tags 200 outside and inside the vehicle at the same time.

In another embodiment, the positioning assembly includes one UWB module 1 and a plurality of anchor antennas 2, and signal transmission and positioning are performed by rapid time-sharing switching of the output end of the UWB module 1 to different anchor antennas 2.

In the present disclosure, the number of the installed UWB modules 1 can be reduced while the same number of anchor antennas 2 are maintained, and the operational use time of the single UWB module 1 is increased, thereby reducing production costs and use costs.

The present disclosure further provides a vehicle-mounted positioning system employing ultra-wideband, including the above-mentioned vehicle-mounted positioning assembly employing ultra-wideband and a positioning device 4, wherein the positioning device 4 controls communication between the vehicle-mounted positioning assembly and the target tag 200, and positions the target tag 200 according to information of communication between the vehicle-mounted positioning assembly and the target tag 200.

The present disclosure further provides a vehicle-mounted positioning method employing ultra-wideband, and reference is made to FIG. 4 which is a schematic flow diagram of a vehicle-mounted positioning method employing ultra-wideband according to an embodiment of the present disclosure. The present specification provides method operation steps described in the embodiment or flow diagram, but more or fewer operation steps may be included based on conventional or non-creative efforts. The sequence of the steps listed in the embodiment is merely one of numerous step execution sequences, and does not represent the unique execution sequence. For an actual device, storage medium or apparatus product, the steps may be executed based on the method sequence illustrated in the embodiment or accompanying drawing or executed in parallel (for example, an environment of parallel processors or multi-threaded processing). Specifically, as shown in FIG. 4, the method may include:

S110: acquiring information of first ultra-wideband radio waves between each anchor antenna 2 and a target tag 200.

In the embodiment of the present disclosure, the information of the first ultra-wideband radio waves includes, but is not limited to, a signal intensity and a signal flight time of each first ultra-wideband signal transmitted between each anchor antenna and the target tag, and may further include communication data of each first ultra-wideband signal.

In practical applications, the target tag 200 may be a tag which can be communicated with the above-mentioned vehicle-mounted positioning system employing ultra-wideband using ultra-wideband signals and satisfies communication protocol conditions. Hardware apparatuses of the tag may include, but are not limited to, physical car keys, mobile apparatuses provided with electronic car keys, unmanned aerial vehicle remote control apparatuses, sensing devices, ETC apparatuses, or the like.

In a specific embodiment, a control device may control the UWB module 1 to transmit or receive the ultra-wideband signal by each anchor antenna 2 to be communicated with the target tag 200. When one UWB module 1 corresponds to a plurality of anchor antennas 2, the UWB module 1 may be in time-sharing connection with corresponding anchor antennas 2 by switching. Under an extreme condition, the vehicle-mounted positioning system has only one UWB module 1, and the control device controls the one UWB module 1 to be in time-sharing connection to all the anchor antennas 2 by switching.

In some embodiments, the step S110 may specifically include: acquiring information of first ultra-wideband radio waves between each anchor antenna 2 and the target tag 200 in a preset region.

In practical applications, the preset region includes a first preset region around the vehicle and/or a second preset region inside the vehicle.

S120: determining an optimal positioning anchor antenna group according to the information of the first ultra-wideband radio waves, wherein the optimal positioning anchor antenna group includes the anchor antennas 2 in at least two preset installation regions, and any anchor antenna 2 in the optimal positioning anchor antenna group is the anchor antenna 2 in the corresponding preset installation region with an optimal sighting condition; the optimal sighting condition is determined according to at least one of the signal flight time, the signal intensity, and a number and/or area of vehicle metal parts in a signal transmission direction of the anchor antenna 2.

In the embodiment of the present disclosure, the anchor antennas 2 in the optimal positioning anchor antenna group belong to different preset installation regions of the vehicle, and may belong to several preset installation regions having highly-ranked sighting conditions with the target tag 200; the sighting condition is satisfied between each anchor antenna 2 and the target tag 200.

In practical applications, the optimal sighting condition may be determined and pre-stored in the vehicle-mounted positioning system during vehicle calibration, or obtained by calculation in a positioning process of the target tag 200.

In a specific embodiment, a method for determining the number and/or area of the vehicle metal parts in the signal transmission direction of the anchor antenna 2 may include: acquiring coordinates of the anchor antenna 2 and each vehicle metal part in a coordinate system pre-stored in the vehicle-mounted positioning system; and calculating the number and/or area of the vehicle metal parts shielding the anchor antenna 2 in the signal transmission direction according to the coordinates of the anchor antenna 2 and the coordinates of each vehicle metal part.

In some embodiments, when two or more anchor antennas 2 in the same preset installation region meet the sighting condition, the anchor antenna 2 which satisfies at least one of the shortest signal flight time, the highest received signal intensity, and the smallest number and/or area of the vehicle metal parts shielding the anchor antenna 2 in the signal transmission direction is the anchor antenna 2 with the optimal sighting condition.

Further, priorities of the above-described conditions may be set, and the anchor antenna 2 satisfying a higher priority condition may be determined as the anchor antenna 2 with the optimal sighting condition. For example, in one embodiment, according to a descending order of the priorities, the conditions are ranked to be the shortest signal flight time, the highest received signal intensity, and the smallest number and/or area of the vehicle metal parts shielding the anchor antenna 2 in the signal transmission direction. When two anchor antennas 2 in the same preset installation region satisfy the shortest signal flight time and the highest received signal intensity respectively, the anchor antenna 2 satisfying the shortest signal flight time is determined to be the anchor antenna 2 with the optimal sighting condition.

It should be noted that the priorities of the above-mentioned conditions may be set according to actual requirements, and are not limited to the above description.

In some other embodiments, when the optimal sighting condition is determined according to two or more target parameters of the signal flight time, the signal intensity, and the number and/or area of the vehicle metal parts shielding the anchor antenna 2 in the signal transmission direction, a method for determining the anchor antenna 2 with the optimal sighting condition may include: ranking all the first ultra-wideband signals in one preset installation region according to each target parameter, so as to obtain ranking number values of the first ultra-wideband signals corresponding to different target parameters (it can be set that the smaller the ranking number value, the higher the signal quality); and multiplying the ranking number values of each first ultra-wideband signal corresponding to the target parameters by corresponding weight coefficients, adding the ranking number values obtained after the multiplication by the weight coefficients to obtain a statistical ranking number value of each first ultra-wideband signal, and determining the anchor antenna 2 with the minimum statistical ranking number value as the anchor antenna 2 with the optimal sighting condition.

S130: controlling an output end of the corresponding UWB module 1 to be connected with each anchor antenna 2 in the optimal positioning anchor antenna group.

In the embodiment of the present disclosure, after the optimal positioning anchor antenna group is determined, each anchor antenna 2 in the optimal positioning anchor antenna group is controlled to be connected with the output end of the corresponding UWB module 1.

In practical applications, when the optimal positioning anchor antenna group corresponds to the same UWB module 1, the step S130 may specifically include: controlling the output end of the UWB module 1 corresponding to the optimal positioning anchor antenna group to be switched among the anchor antennas 2 in the optimal positioning anchor antenna group at a first preset time interval, so as to be in time-sharing connection with the anchor antennas 2 in the optimal positioning anchor antenna group.

In some embodiments, the output end of the UWB module 1 may be in time-sharing connection to connection ends of the anchor antennas 2 in the optimal positioning anchor antenna group by switching of an electronic switch 3.

S140: acquiring information of second ultra-wideband radio waves between the target tag 200 and each anchor antenna 2 in the optimal positioning anchor antenna group.

In the embodiment of the present disclosure, the UWB module 1 performs signal transmission with the target tag 200 by the anchor antennas 2 of the optimal positioning anchor antenna group, so as to obtain the information of the second ultra-wideband radio waves. The information of the second ultra-wideband radio waves includes communication data, a signal intensity and a signal flight time of each second ultra-wideband signal.

S150: positioning the target tag 200 according to the information of the second ultra-wideband radio waves to obtain a located position of the target tag 200 relative to the current vehicle 100.

In the embodiment of the present disclosure, the located position of the target tag 200 relative to the current vehicle 100 is calculated based on the information of the second ultra-wideband radio waves, and an algorithm thereof may be the same as an existing ultra-wideband positioning algorithm, which is not limited herein by the present disclosure.

In practical applications, the located position of the target tag 200 relative to the current vehicle 100 may be a position of the target tag 200 in the coordinate system pre-stored in the vehicle-mounted positioning system.

In some embodiments, the vehicle-mounted positioning method employing ultra-wideband according to the present embodiment may be based on the above-mentioned vehicle-mounted positioning assembly and system employing ultra-wideband.

Based on some or all of the above-mentioned implementations, in some embodiments, the step S120 may include:

S121a: determining an estimated position of the target tag 200 relative to the current vehicle 100 according to the information of the first ultra-wideband radio waves.

In practical applications, the estimated position may indicate that the target tag 200 is located within a certain direction angle range of the current vehicle 100. The estimated position may also indicate that the target tag 200 is located in a three-dimensional space region within a certain three-dimensional coordinate range of the current vehicle 100.

In a specific embodiment, the vehicle-mounted positioning system may pre-store a coordinate system based on the current vehicle 100 itself, and pre-store positions of all anchor antennas 2 in the coordinate system. The estimated position of the target tag 200 in the coordinate system may be determined according to the position of each anchor antenna 2 and the information of the first ultra-wideband radio waves.

S122a: when the estimated position is obtained, calling a table of corresponding relationships between sub-regions in the preset region around the current vehicle 100 and positioning anchor antenna groups.

In practical applications, the preset region may include a plurality of sub-regions, and the table of the corresponding relationships records preset corresponding relationships between the sub-regions and the positioning anchor antenna groups for positioning. The preset corresponding relationships may be determined during vehicle calibration, and may be determined according to at least one of flight times and intensities of signals between a calibration tag and each anchor antenna and a number and/or area of vehicle metal parts in a signal transmission direction of the anchor antenna in the calibration process.

S123a: matching the estimated position with the sub-regions in the table of the corresponding relationships to determine a sub-region containing the estimated position.

S124a: determining a positioning anchor antenna group corresponding to the sub-region containing the estimated position, and taking the determined positioning anchor antenna group as the optimal positioning anchor antenna group.

In practical applications, the coordinate system pre-stored in the vehicle-mounted positioning system of the current vehicle 100 may be coordinate grids, and in some embodiments, the coordinate grids may be equidistant coordinate grids, such as coordinate grids with a side length of 50 cm; in some other embodiments, the coordinate grids may be non-equidistant grids designed in segments according to a distance from the vehicle. A region corresponding to one or more of the coordinate grids may be set as the sub-region, and the sub-regions may have the same or different numbers of grids.

Further, in one embodiment, the anchor antenna 2 corresponding to each coordinate grid and having the sighting condition can be determined according to a geometric relationship between the coordinate grid and each anchor antenna 2, a signal shielding condition of the vehicle (determined according to an appearance structure of the vehicle type, such as the number and/or area of the vehicle metal parts in the signal transmission direction of the anchor antenna), or the like, and then, the positioning anchor antenna group corresponding to the sub-region and having the optimal sighting condition can be determined, and each sub-region may be matched with one positioning anchor antenna group.

Further, the vehicle-mounted positioning system may pre-store the preset table of the corresponding relationships, and search, according to the sub-region to which the determined estimated position belongs, the positioning anchor antenna group corresponding to the sub-region as the current optimal positioning anchor antenna group.

Further, the estimated position may belong to or include a plurality of sub-regions, and correspond to a plurality of positioning anchor antenna groups, and the positioning anchor antenna group corresponding to the sub-region centered in the plurality of sub-regions may be selected as the optimal positioning anchor antenna group, or a positioning anchor antenna group having a highest average signal intensity and/or a shortest average signal flight time may be selected as the optimal positioning anchor antenna group.

Based on some or all of the above-mentioned implementations, in the embodiment of the present disclosure, the step S121 may include:

S1211a: comparing the signal intensity of each first ultra-wideband signal with a first preset intensity.

S1212a: determining the first ultra-wideband signal with the signal intensity greater than or equal to the first preset intensity as a valid first ultra-wideband signal.

S1213a: determining the estimated position of the target tag 200 relative to the current vehicle 100 using the signal intensity and the signal flight time of the valid first ultra-wideband signal.

In practical applications, the first ultra-wideband signal with the signal intensity less than the first preset intensity may be discarded.

In some embodiments, n valid first ultra-wideband signals are obtained, and then, a distance between the corresponding anchor antenna 2 and the target tag 200 is determined according to the signal flight time of each valid first ultra-wideband signal; that is, it is determined that the target tag 200 may be located on a spherical housing-shaped region with a certain thickness formed with the corresponding anchor antenna 2 as a spherical center and the distance as a radius, the n valid first ultra-wideband signals correspond to n spherical housing-shaped regions with a certain thickness, and an intersection region of the n spherical housing-shaped regions with a certain thickness corresponds to the estimated position of the target tag 200 relative to the current vehicle 100.

In one embodiment, in a scenario where a user holds a target tag 200 apparatus and enters the preset region, since the user is generally a natural person, and a height of the user is usually within a preset height range, it may be determined that a height of the target tag 200 apparatus held by the user is also within the preset height range. Therefore, after the intersection region of the n spherical housing-shaped regions with a certain thickness is obtained, a region of the intersection region within the preset height range may be further determined as the estimated position of the target tag 200 relative to the current vehicle 100.

Based on some or all of the above-mentioned implementations, in the embodiment of the present disclosure, the information of the second ultra-wideband radio waves includes the signal flight time of each second ultra-wideband signal transmitted between each anchor antenna 2 in the optimal positioning anchor antenna group and the target tag 200; the step S150 may specifically include: positioning the target tag 200 according to the signal flight time of each second ultra-wideband signal.

In practical applications, a distance between each anchor antenna 2 in the optimal positioning anchor antenna group and the target tag 200 may be calculated according to the signal flight time of each second ultra-wideband signal, and the position of the target tag 200 relative to the current vehicle 100 is calculated according to the distances.

It should be noted that there may exist multipath signals in the first ultra-wideband signals in the information of the first ultra-wideband radio waves, and the signal intensities of some multipath signals may also be greater than or equal to the first preset intensity, and therefore, there exists a deviation between the calculated estimated position and a true position of the target tag 200, and by performing positioning calculation again according to the information of the second ultra-wideband radio waves obtained by the optimal positioning anchor antenna group, influences of the multipath signals are reduced, thus improving positioning accuracy.

In some embodiments, before the step S150, the method further includes: judging whether each second ultra-wideband signal in the information of the second ultra-wideband radio waves meets a preset condition, and if yes, executing the step S150; if no, repeating the steps S120 to S140.

Further, the optimal positioning anchor antenna group may reacquire each second ultra-wideband signal at an interval of a preset second ultra-wideband signal sampling time, and the preset condition may include, but is not limited to, one or more of the following conditions: whether the signal intensity of each second ultra-wideband signal is greater than or equal to a first preset value; whether a signal intensity difference between two second ultra-wideband signals obtained by each anchor antenna in adjacent sampling times or a preset interval time is less than or equal to a second preset value; whether the signal flight time of each second ultra-wideband signal is less than or equal to a first time threshold; whether a signal flight time difference between two second ultra-wideband signals obtained by each anchor antenna in adjacent sampling times or a preset interval time is less than or equal to a second time threshold. When each second ultra-wideband signal does not satisfy the preset condition, a multipath signal may exist, and therefore, the estimated position and/or the corresponding optimal positioning anchor antenna group may be re-determined to re-calculate the position of the target tag 200 relative to the current vehicle 100.

Further, when the estimated position is calculated according to each first ultra-wideband signal, a selection condition of the first ultra-wideband signal may converge, and the first ultra-wideband signal with the signal intensity greater than or equal to a second preset intensity is selected to calculate the estimated position. The second preset intensity is greater than the first preset intensity. Thus, possibility that the multipath signal interferes with a calculation result is reduced, accuracy of determining the optimal positioning anchor antenna group is improved, and it is guaranteed that the optimal sighting condition is satisfied between the anchor antenna 2 for positioning and the target tag 200.

Based on some or all of the above-mentioned implementations, in the embodiment of the present disclosure, after the step S150, the method further includes: judging whether the sub-region to which the position calculated in the step S150 belongs is the same as the sub-region of the estimated position; if no, re-searching the positioning anchor antenna group matched with the sub-region to which the position calculated in the step S150 belongs according to the preset table of the corresponding relationships; determining the re-searched positioning anchor antenna group as an updated optimal positioning anchor antenna group; acquiring updated information of second ultra-wideband radio waves between the updated optimal positioning anchor antenna group and the target tag 200; and repositioning the target tag 200 according to the updated information of the second ultra-wideband radio waves to obtain an updated position of the target tag 200 relative to the current vehicle 100.

Based on some or all of the above-mentioned implementations, in some other embodiments, the step S120 may include:

S121*b*: comparing the signal flight times of the first ultra-wideband signals in the information of the first ultra-wideband radio waves; and S122*b*: determining the optimal positioning anchor antenna group according to a comparison result, wherein the optimal positioning anchor antenna group at least includes a first anchor antenna which has the shortest signal flight time and belongs to a first preset installation region and a second anchor antenna which belongs to a second preset installation region and has a signal flight time closest to the signal flight time of the first anchor antenna.

In practical applications, the first anchor antenna with the shortest signal flight time is determined by comparing the signal flight times of the first ultra-wideband signals and used as one anchor antenna 2 in the optimal positioning anchor antenna group. The second anchor antenna which does not belong to the first preset installation region and has a signal flight time closest to the signal flight time of the first anchor antenna is selected as another anchor antenna 2 of the optimal positioning anchor antenna group.

It should be noted that the optimal positioning anchor antenna group may further include a third anchor antenna, or the like, and the number of the anchor antennas included therein may be set according to conditions, such as the vehicle type, an application scenario, or the like. The third anchor antenna has similar properties to the second anchor antenna and is an anchor antenna 2 belonging to a third preset installation region (different from the first and second preset installation regions) and having a signal flight time closest to the signal flight time of the second anchor antenna.

Similarly, a fourth anchor antenna, or the like, may be determined.

For example, the first five of the anchor antennas ranked according to the signal flight time are M1\M2\M3\M4\M5, M1 and M2 belong to the first preset installation region, M3 and M4 belong to the second preset installation region, and M5 belongs to the third preset installation region; if the total number of the anchor antennas of the optimal positioning anchor antenna group is set to 3, M1, M3 and M5 form the optimal positioning anchor antenna group in which M1 is the first anchor antenna, M3 is the second anchor antenna, and M5 is the third anchor antenna.

Further, after the step S122*b*, a cyclic sampling step S123*b* may be further included: repeating steps S121*b* and S122*b* at an interval of a preset sampling time to determine the optimal positioning anchor antenna group.

Further, after the step S123*b*, the method may further include a signal evaluation step S124*b*: acquiring signal flight time statistical data of the first ultra-wideband signal of each anchor antenna 2 according to a sampling time sequence, the statistical data including variance of the signal flight times obtained according to sampling times (or the distances between the anchor antenna 2 and the target tag 200 calculated according to the signal flight times) and/or the signal flight time difference of the first ultra-wideband signals corresponding to the adjacent sampling times, so as to judge whether the first ultra-wideband signals are abnormal.

In some embodiments, if the variance is less than or equal to a preset variance value and/or the signal flight time difference of the adjacent sampling times is less than or equal to a preset adjacent time difference, it is determined that the first ultra-wideband signal is not abnormal, and the anchor antenna 2 corresponding to the first ultra-wideband signal may continue to be used as one positioning anchor antenna 2 in the optimal positioning anchor antenna group.

Conversely, the method proceeds to S122*a* again to re-determine the optimal positioning anchor antenna group, and the anchor antenna 2 with a signal flight time lower than and closest to that of the abnormal anchor antenna 2 may be selected to replace the current abnormal anchor antenna 2.

Based on some or all of the above-mentioned implementations, in some other embodiments, the step S120 may include:

S121*c*: comparing the signal intensities of the first ultra-wideband signals in the information of the first ultra-wideband radio waves; and S122*c*: determining the optimal positioning anchor antenna group according to a comparison result, wherein the optimal positioning anchor antenna group at least includes a first anchor antenna which has the highest signal intensity and belongs to a first preset installation region and a second anchor antenna which belongs to a second preset installation region and has a signal intensity closest to the signal intensity of the first anchor antenna.

Based on some or all of the above-mentioned implementations, in some other embodiments, the step S120 may include:

S121*d*: comparing the numbers and/or areas of the vehicle metal parts in the signal transmission directions of the anchor antennas 2 corresponding to the first ultra-wideband signals in the information of the first ultra-wideband radio waves; and S122*d*: determining the optimal positioning anchor antenna group according to a comparison result, wherein the optimal positioning anchor antenna group at least includes a first anchor antenna which has the smallest number and/or area of the vehicle metal parts and belongs to a first preset installation region and a second anchor antenna which belongs to a second preset installation region and has a number and/or area of the vehicle metal parts closest to the number and/or area of the vehicle metal parts of the first anchor antenna.

In practical applications, the implementations, the corresponding cyclic sampling steps and the signal evaluation steps of steps S121*c* and S122*c* as well as S121*d* and S122*d* are similar to those of steps S121*b* and S122*b*, the signal flight time is replaced by the signal intensity or the number and/or area of the vehicle metal parts, and details are not repeated herein.

Further, in some other embodiments, the step S120 may include:

S121*d*: ranking according to at least two of the signal flight time, the signal intensity and the number and/or area of the vehicle metal parts of each first ultra-wideband signal in the information of the first ultra-wideband radio waves, wherein a ranking rule may be that when the signal flight time is shorter, the signal intensity is higher, and the number and/or area of the vehicle metal parts are/is minimum, a ranking value is smaller;

S122*d*: multiplying the ranking values of each first ultra-wideband signal by corresponding weight coefficients, and then adding the results to obtain a comprehensive ranking value of the anchor antenna 2 corresponding to the first ultra-wideband signal; and S123*d*: determining the optimal positioning anchor antenna group according to the comprehensive ranking value, wherein the optimal positioning anchor antenna group at least includes a first anchor antenna which has the smallest comprehensive ranking value and belongs to a first preset installation region and a second anchor antenna which belongs to a second preset installation region and has a comprehensive ranking value closest to the comprehensive ranking value of the first anchor antenna.

In practical applications, the implementations, the corresponding cyclic sampling step and the signal evaluation step of steps S121*d* to S123*d* are similar to those of steps S121*b* and S122*b*, and details are not repeated herein.

Based on some or all of the above-mentioned implementations, in the embodiment of the present disclosure, after the step S150, the method may further include:

S210: monitoring whether the position of the target tag 200 changes.

In practical applications, the target tag 200 may be repositioned at an interval of a second preset time by the currently determined optimal positioning anchor antenna group, and the latest positioning result and the previous positioning result are compared to judge whether the position of the target tag 200 changes. And/or, the above steps S110 to S120 may be repeated at an interval of a third preset time, and the latest estimated position and the previous estimated position are compared to judge whether the position of the target tag 200 changes.

S220: if a monitoring result is yes, judging whether a first optimal positioning anchor antenna group currently for positioning is matched with the current position of the target tag 200.

S230: if a judgment result is no, re-determining a second optimal positioning anchor antenna group according to the current position of the target tag 200. If the judgment result is yes, the step S210 is executed again.

In practical applications, a sub-region to which the current position belongs is determined, a positioning anchor antenna group corresponding to the sub-region to which the current position belongs is searched according to the preset table of the corresponding relationships, and whether the positioning anchor antenna group is consistent with the first optimal positioning anchor antenna group currently for positioning is judged. If no, the positioning anchor antenna group corresponding to the sub-region to which the current position belongs is determined as the second optimal positioning anchor antenna group.

S240: controlling the output end of the corresponding UWB module 1 to be connected with the anchor antennas 2 in the second optimal positioning anchor antenna group.

S250: acquiring information of third ultra-wideband radio waves between the second optimal positioning anchor antenna group and the target tag 200.

S260: repositioning the target tag 200 according to the information of the third ultra-wideband radio waves.

S270: executing the step S210 again.

The information of the third ultra-wideband radio waves includes, but is not limited to, communication data, a signal intensity and a signal flight time of each third ultra-wideband signal.

It should be noted that there may exist error signals in the first ultra-wideband signals in the information of the first ultra-wideband radio waves, for example, when one or more anchor antennas 2 receive the first ultra-wideband signal transmitted by the target tag 200 and reflected by a strong reflector. When one or more error signals have high signal intensities, but the distance between the anchor antenna 2 and the target tag 200 calculated according to the signal flight time thereof is wrong, the estimated position or the located position has a large deviation, such that the determined optimal positioning anchor antenna group is not matched with the actual position of the target tag 200, thereby causing positioning failure or a larger positioning error. In some embodiments, the steps S110 to S150 may be repeated at an interval of a fourth preset time, such that the error signal disappears; for example, when the target tag 200 moves into a sub-region without the above-mentioned reflection by the strong reflector, an accurate position can be determined, so as to eliminate an influence of the error signal on the positioning result.

Thus, when the position of the target tag 200 changes, the optimal positioning anchor antenna group is also changed correspondingly, so as to form an optimal "positioning anchor antenna dynamic pattern"; the positioning algorithm uses such an optimal "positioning anchor antenna dynamic pattern" to solve and output the position information of the target tag 200 with higher precision.

The vehicle-mounted positioning system and method employing ultra-wideband according to the present disclosure are described below based on a vehicle-mounted positioning system having 6 UWB modules 1 and 18 anchor antennas 2, and referring to FIGS. 2 and 3, each UWB module 1 is in time-sharing connection with 3 anchor antennas 2 by an electronic switch 3. The left front region 101 of the current vehicle 100 is provided with the anchor antennas A1, A2 and A3 which correspond to the first UWB module; the right front region 102 is provided with the anchor antennas D1, D2 and D3 which correspond to the fourth UWB module; the left rear region 103 is provided with the anchor antennas B1, B2 and B3 which correspond to the second UWB module; the right rear region 104 is provided with the anchor antennas C1, C2 and C3 which correspond to the third UWB module; the left region 105 is provided with the anchor antenna E1, the right region 106 is provided with the anchor antenna F1, the roof region 107 is provided with the anchor antennas E2, E3, F2 and F3, and E1, E2 and E3 correspond to the fifth UWB module; F1, F2 and F3 correspond to the sixth UWB module, and in the present embodiment, the first to fourth UWB modules are configured to be communicated with the target tag 200 around the vehicle, and the fifth and sixth UWB modules may be configured to be simultaneously communicated with the target tags 200 around and inside the vehicle.

Further, the positioning device 4 controls all the UWB modules 1 to be in time-sharing connection with the corresponding anchor antennas 2 respectively, be communicated with the target tag 200, rank the received first ultra-wideband signals, discard the first ultra-wideband signals with the signal intensities lower than the first preset intensity, and calculate the estimated position using the remaining first ultra-wideband signals.

Figure 5:
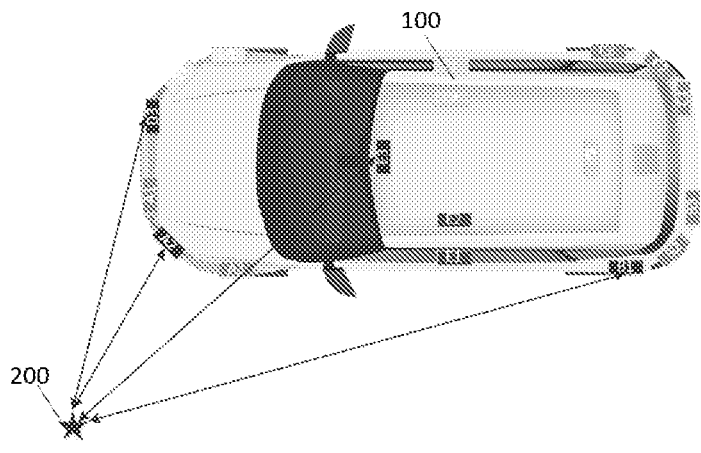
FIGS. 5 and 6 are schematic diagrams of positioning of a target tag in an embodiment of the present disclosure.

Further, referring to FIG. 5, the calculated position is located in the left front of the current vehicle 100, and corresponds to a left front sub-region in the preset region, the corresponding optimal positioning anchor antenna group includes the anchor antennas D3, A2, E3, and B1, the electronic switch 3 of the first UWB module is controlled to be connected to A2, the electronic switch 3 of the second UWB module is connected to B1, the electronic switch 3 of the fourth UWB module is connected to D3, and the electronic switch 3 of the fifth UWB module is connected to E3, so as to obtain respective second ultra-wideband signals, and the position of the target tag 200 relative to the current vehicle 100 is calculated according to the signal flight times of the second ultra-wideband signals.

Further, whether the position of the target tag 200 changes is monitored by polling the optimal positioning anchor antenna group, and when it is monitored that the position changes, the sub-region to which a calculated latest position belongs is determined, whether the positioning anchor antenna group matched with the sub-region to which the latest position belongs is consistent with the current optimal positioning anchor antenna group is judged, and if no, the positioning anchor antenna group matched with the sub-region to which the latest position belongs is updated to be a current second optimal positioning anchor antenna group.

Further, communication with the target tag 200 is performed by the second optimal positioning anchor antenna group to perform repositioning, so as to obtain an updated latest position of the target tag 200.

Figure 6:
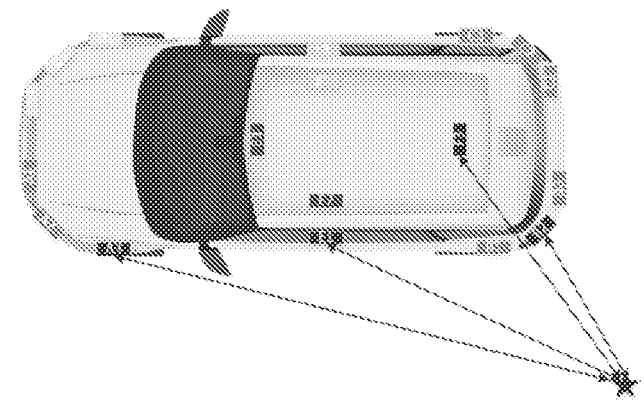

Referring to FIG. 6, it is monitored that the position of the target tag 200 moves to the left rear of the current vehicle 100, and corresponds to a left rear sub-region in the preset region, the positioning anchor antenna group matched with the sub-region includes the anchor antennas A3, E1, F3, and B2, the electronic switch 3 of the first UWB module is controlled to be connected to A3, the electronic switch 3 of the second UWB module is connected to B2, the electronic switch 3 of the fifth UWB module is connected to E1, and the electronic switch 3 of the sixth UWB module is connected to F3, so as to obtain updated second ultra-wideband signals, and the position of the target tag 200 relative to the current vehicle 100 is re-calculated according to the signal flight times of the updated second ultra-wideband signals.

Figure 7:
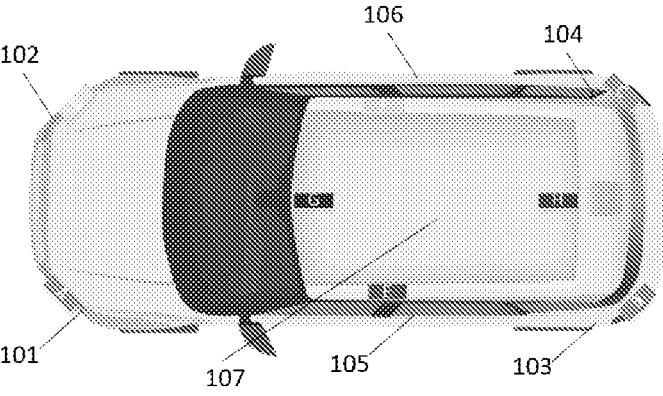
FIG. 7 is a schematic structural diagram in which an anchor antenna is installed on a vehicle in the prior art.
Figure 8:
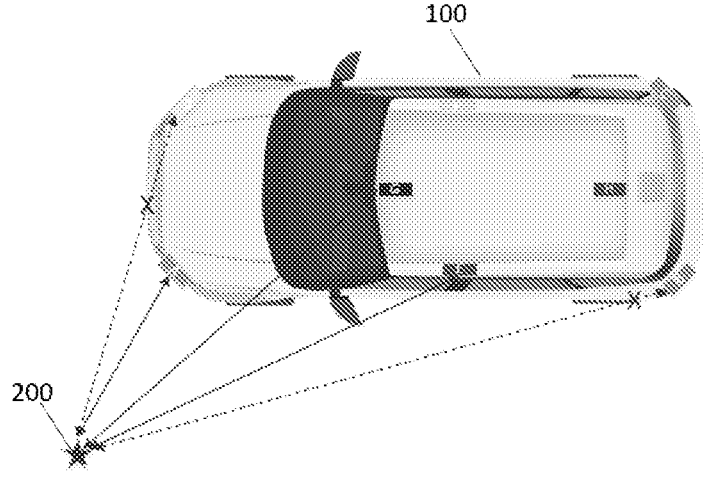
FIG. 8 is a schematic diagram of positioning of a target tag in the prior art.

Referring to FIGS. 7 and 8, a vehicle-mounted positioning system of the prior art has 6 UWB modules 1 and 6 anchor antennas 2, and the anchor antennas 2 are arranged in a left front region 101, a right front region 102, a left rear region 103, a right rear region 104, a left region 105, a right region 106 and a roof region 107 of a vehicle respectively and are A, B, C, D, E, F, and G respectively. For a target tag 200 located in the left front of the vehicle, the anchor antennas 2 which can be used for positioning only include A, E and G, and D and B do not have a sighting condition due to limitation of a vehicle shape. In the case where the same number of UWB modules 1 are provided, the number of the anchor antennas 2 used for positioning in each sub-region in the prior art is significantly smaller than that in the above-mentioned embodiments of the present disclosure.

The present disclosure further provides a vehicle-mounted positioning apparatus employing ultra-wideband, including a processor and a memory, wherein the memory stores at least one instruction or at least one program, and the at least one instruction or the at least one program is loaded and executed by the processor to implement the vehicle-mounted positioning method employing ultra-wideband as described above.

The present disclosure further provides a computer-readable storage medium having at least one code or instruction stored therein, the at least one code or instruction being loaded and executed by a processor to implement the above-mentioned vehicle-mounted positioning method employing ultra-wideband.

In the embodiments of the present disclosure, the memory and/or the storage medium may be configured to store software programs and modules, and the processor may execute various functional applications and perform data processing by operating the software programs and modules stored in the memory. The memory and/or the storage medium may mainly include a program storage region and a data storage region, and the program storage region may store an operating device, an application required for functions, or the like; the data storage region may store data created according to use of the apparatus, or the like.

Furthermore, the memory and/or the storage medium may include a high speed random access memory, and may further include a non-volatile memory, such as at least one disk storage device, a flash memory device, or other volatile solid state storage devices. Correspondingly, the memory and/or the storage medium may further include a storage controller to provide the processor with access to the memory and/or the storage medium.

Figure 9:
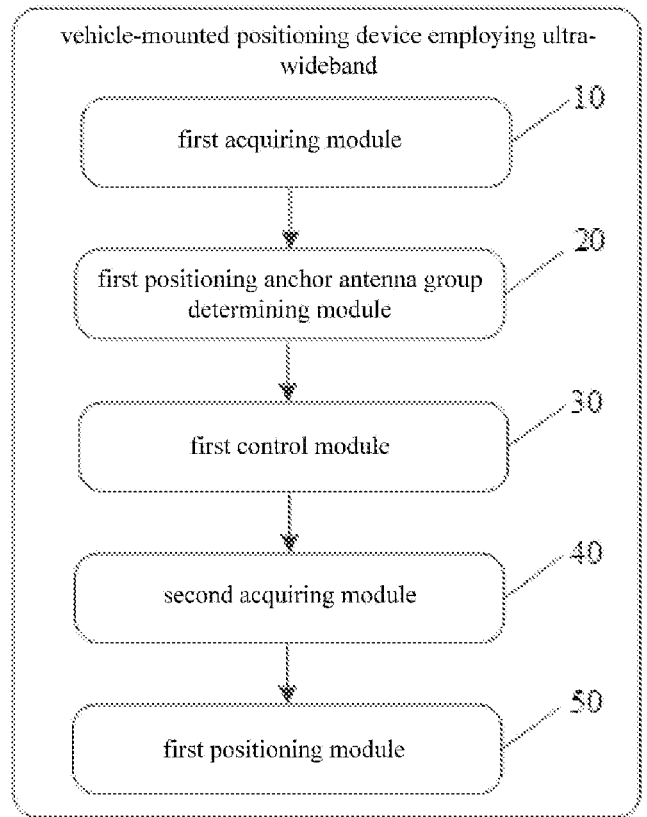
FIG. 9 is a schematic structural block diagram of a vehicle-mounted positioning device employing ultra-wideband according to an embodiment of the present disclosure.

The present disclosure further provides a vehicle-mounted positioning device employing ultra-wideband, and reference is made to FIG. 9 which shows a schematic structural block diagram of a vehicle-mounted positioning device employing ultra-wideband according to the present disclosure, including:

a first acquiring module 10 configured to acquire information of first ultra-wideband radio waves between each anchor antenna 2 on a current vehicle 100 and a target tag 200, wherein the information of the first ultra-wideband radio waves includes a signal intensity and a signal flight time of each first ultra-wideband signal transmitted between each anchor antenna 2 and the target tag 200;

a first positioning anchor antenna group determining module 20 configured to determine an optimal positioning anchor antenna group according to the information of the first ultra-wideband radio waves, wherein the optimal positioning anchor antenna group includes the anchor antennas 2 in at least two preset installation regions, and any anchor antenna 2 in the optimal positioning anchor antenna group is the anchor antenna 2 in the corresponding preset installation region with an optimal sighting condition; the optimal sighting condition is determined according to at least one of the signal flight time, the signal intensity, and a number and/or area of vehicle metal parts in a signal transmission direction of the anchor antenna 2;

a first control module 30 configured to control an output end of a corresponding UWB module 1 to be connected with the anchor antennas 2 in the optimal positioning anchor antenna group;

a second acquiring module 40 configured to acquire information of second ultra-wideband radio waves between the target tag 200 and each anchor antenna 2 in the optimal positioning anchor antenna group; and a first positioning module 50 configured to position the target tag 200 according to the information of the second ultra-wideband radio waves to obtain a located position of the target tag 200 relative to the current vehicle 100.

In the embodiment of the present disclosure, the first positioning anchor antenna group determining module 20 may include:

an estimated position determining unit configured to determine an estimated position of the target tag 200 relative to the current vehicle 100 according to the information of the first ultra-wideband radio waves;

a corresponding relationship table calling unit configured to, when the estimated position is obtained, call a table of corresponding relationships between sub-regions in a preset region around the current vehicle 100 and positioning anchor antenna groups;

a sub-region determining unit configured to match the estimated position with the sub-regions in the table of the corresponding relationships to determine a sub-region containing the estimated position; and a first optimal positioning anchor antenna group determining unit configured to determine a positioning anchor antenna group corresponding to the sub-region containing the estimated position, and take the determined positioning anchor antenna group as the optimal positioning anchor antenna group.

In some embodiments, the first positioning anchor antenna group determining module 20 may include:

a signal flight time comparing unit configured to compare the signal flight times of the first ultra-wideband signals in the information of the first ultra-wideband radio waves; and a second optimal positioning anchor antenna group determining unit configured to determine the optimal positioning anchor antenna group according to a comparison result, wherein the optimal positioning anchor antenna group at least includes a first anchor antenna which has the shortest signal flight time and belongs to a first preset installation region and a second anchor antenna which belongs to a second preset installation region and has a signal flight time closest to the signal flight time of the first anchor antenna.

In some embodiments, the first positioning anchor antenna group determining module 20 may include:

a signal intensity comparing unit configured to compare the signal intensities of the first ultra-wideband signals in the information of the first ultra-wideband radio waves; and a third optimal positioning anchor antenna group determining unit configured to determine the optimal positioning anchor antenna group according to a comparison result, wherein the optimal positioning anchor antenna group at least includes a first anchor antenna which has the highest signal intensity and belongs to a first preset installation region and a second anchor antenna which belongs to a second preset installation region and has a signal intensity closest to the signal intensity of the first anchor antenna.

In the embodiment of the present disclosure, the device may further include: a monitoring module configured to monitor whether the position of the target tag 200 changes;

a judging module configured to, if a monitoring result is yes, judge whether the first optimal positioning anchor antenna group currently for positioning is matched with the current position of the target tag 200;

a second positioning anchor antenna group determining module configured to: if a judgment result is no, re-determine a second optimal positioning anchor antenna group according to the current position of the target tag 200;

a second control module configured to control the output end of the corresponding UWB module 1 to be connected with the anchor antennas 2 in the second optimal positioning anchor antenna group;

a third acquiring module configured to acquire information of third ultra-wideband radio waves between the re-determined optimal positioning anchor antenna group and the target tag 200; and a second positioning module configured to reposition the target tag 200 according to the information of the third ultra-wideband radio waves.

In the embodiment of the present disclosure, the estimated position determining unit may include:

a comparing subunit configured to compare the signal intensity of each first ultra-wideband signal with a first preset intensity;

a valid first ultra-wideband signal determining subunit configured to determine the first ultra-wideband signal with the signal intensity greater than or equal to the first preset intensity as a valid first ultra-wideband signal; and an estimated position determining subunit configured to determine the estimated position of the target tag 200 relative to the current vehicle 100 according to the signal intensity and the signal flight time of the valid first ultra-wideband signal.

In the embodiment of the present disclosure, the information of the second ultra-wideband radio waves includes the signal flight time of each second ultra-wideband signal transmitted between each anchor antenna 2 in the optimal positioning anchor antenna group and the target tag 200; the first positioning module 60 may be specifically configured to: position the target tag 200 according to the signal flight time of each second ultra-wideband signal.

In the embodiment of the present disclosure, when the optimal positioning anchor antenna group corresponds to the same UWB module 1, the first control module 40 may be specifically configured to: control the output end of the UWB module 1 corresponding to the optimal positioning anchor antenna group to be switched among the anchor antennas 2 in the optimal positioning anchor antenna group at a first preset time interval.

The device in the device embodiments is based on the same inventive concept as the method embodiments.

The present disclosure further provides a vehicle, including the above-mentioned vehicle-mounted positioning assembly, device, or apparatus employing ultra-wideband.

From the above-mentioned embodiments of the vehicle-mounted positioning assembly, method, device, apparatus, and system employing ultra-wideband, the storage medium, or the vehicle according to the present disclosure, it is observed that in the present disclosure, the number of the installed UWB modules 1 can be reduced while the same number of anchor antennas 2 are maintained, and the operational use time of a single UWB module 1 is increased, thereby reducing the production costs and the use costs.

So far, those skilled in the art should be aware that, although exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:

1. A vehicle-mounted positioning method employing ultra-wideband, comprising:

acquiring information of first ultra-wideband radio waves between each anchor antenna on a current vehicle and a target tag, wherein the information of the first ultra-wideband radio waves comprises a signal intensity and a signal flight time of each first ultra-wideband signal transmitted between each anchor antenna and the target tag;

determining an optimal positioning anchor antenna group according to the information of the first ultra-wideband radio waves, wherein the optimal positioning anchor antenna group comprises the anchor antennas in at least two preset installation regions, and any anchor antenna in the optimal positioning anchor antenna group is the anchor antenna in the corresponding preset installation region with an optimal sighting condition; the optimal sighting condition is determined according to at least one of the signal flight time, the signal intensity, and a number and/or area of vehicle metal parts in a signal transmission direction of the anchor antenna;

controlling an output end of a corresponding ultra-wideband (UWB) module to be connected with each anchor antenna in the optimal positioning anchor antenna group;

acquiring information of second ultra-wideband radio waves between the target tag and each anchor antenna in the optimal positioning anchor antenna group; and positioning the target tag according to the information of the second ultra-wideband radio waves to obtain a located position of the target tag relative to the current vehicle.

2. The method according to claim 1, wherein the determining an optimal positioning anchor antenna group according to the information of the first ultra-wideband radio waves comprises:

determining an estimated position of the target tag relative to the current vehicle according to the information of the first ultra-wideband radio waves;

when the estimated position is obtained, calling a table of corresponding relationships between sub-regions in a preset region around the current vehicle and positioning anchor antenna groups;

matching the estimated position with the sub-regions in the table of the corresponding relationships to determine a sub-region containing the estimated position; and determining a positioning anchor antenna group corresponding to the sub-region containing the estimated position, and taking the determined positioning anchor antenna group as the optimal positioning anchor antenna group.

3. The method according to claim 2, wherein the determining an estimated position of the target tag relative to the current vehicle according to the information of the first ultra-wideband radio waves comprises:

comparing the signal intensity of each first ultra-wideband signal with a first preset intensity;

determining the first ultra-wideband signal with the signal intensity greater than or equal to the first preset intensity as a valid first ultra-wideband signal; and determining the estimated position of the target tag relative to the current vehicle according to the signal intensity and the signal flight time of the valid first ultra-wideband signal.

4. The method according to claim 1, wherein the determining an optimal positioning anchor antenna group according to the information of the first ultra-wideband radio waves comprises:

comparing the signal flight times of the first ultra-wideband signals in the information of the first ultra-wideband radio waves; and determining the optimal positioning anchor antenna group according to a comparison result, the optimal positioning anchor antenna group at least comprising a first anchor antenna which has the shortest signal flight time and belongs to a first preset installation region and a second anchor antenna which belongs to a second preset installation region and has a signal flight time closest to the signal flight time of the first anchor antenna.

5. The method according to claim 4, wherein the determining an optimal positioning anchor antenna group according to the information of the first ultra-wideband radio waves comprises:

comparing the signal intensities of the first ultra-wideband signals in the information of the first ultra-wideband radio waves; and determining the optimal positioning anchor antenna group according to a comparison result, the optimal positioning anchor antenna group at least comprising a first anchor antenna which has the highest signal intensity and belongs to a first preset installation region and a second anchor antenna which belongs to a second preset installation region and has a signal intensity closest to the signal intensity of the first anchor antenna.

6. The method according to claim 1, wherein the determining an optimal positioning anchor antenna group according to the information of the first ultra-wideband radio waves comprises:

comparing the signal intensities of the first ultra-wideband signals in the information of the first ultra-wideband radio waves; and determining the optimal positioning anchor antenna group according to a comparison result, the optimal positioning anchor antenna group at least comprising a first anchor antenna which has the highest signal intensity and belongs to a first preset installation region and a second anchor antenna which belongs to a second preset installation region and has a signal intensity closest to the signal intensity of the first anchor antenna.

7. The method according to claim 1, after positioning the target tag according to the information of the second ultra-wideband radio waves, further comprising:

monitoring whether the position of the target tag changes;

if a monitoring result is yes, judging whether a first optimal positioning anchor antenna group currently for positioning is matched with the current position of the target tag;

if a judgment result is no, re-determining a second optimal positioning anchor antenna group according to the current position of the target tag;

controlling the output end of the corresponding ultra-wideband (UWB) module to be connected with the anchor antennas in the second optimal positioning anchor antenna group;

acquiring information of third ultra-wideband radio waves between the second optimal positioning anchor antenna group and the target tag; and repositioning the target tag according to the information of the third ultra-wideband radio waves.

8. The method according to claim 1, wherein the information of the second ultra-wideband radio waves comprises signal flight time of each second ultra-wideband signal transmitted between each anchor antenna in the optimal positioning anchor antenna group and the target tag; and the positioning the target tag according to the information of the second ultra-wideband radio waves specifically comprises:

positioning the target tag according to the signal flight time of each second ultra-wideband signal.

9. The method according to claim 1, wherein when the optimal positioning anchor antenna group corresponds to the same ultra-wideband (UWB) module, controlling the output end of the corresponding ultra-wideband (UWB) module to be connected with each anchor antenna in the optimal positioning anchor antenna group specifically comprises:

controlling the output end of the ultra-wideband (UWB) module corresponding to the optimal positioning anchor antenna group to be switched among the anchor antennas in the optimal positioning anchor antenna group at a first preset time interval.

10. A vehicle-mounted positioning apparatus employing ultra-wideband, comprising a processor and a memory, wherein the memory stores at least one instruction or at least one program, and the at least one instruction or the at least one program is loaded and executed by the processor to implement the vehicle-mounted positioning method employing ultra-wideband according to claim 1.

* * * * *